United States Patent [19]

Maekawa et al.

[11] Patent Number: 4,910,270

[45] Date of Patent: Mar. 20, 1990

[54] COMPOSITION CONTAINING EPOXY RESIN, DI(METH)ACRYLATE, N-HETEROCYLIC COMPOUND AND POLYAMINE

[75] Inventors: Zenichiro Maekawa, Amagasaki; Kazuo Uede, Ikoma; Shinichi Yasuda, Otsu; Tetsuzi Takata, Kadoma; Yosiaki Turuta, Neyagawa, all of Japan

[73] Assignee: Koei Chemical Co., Ltd., Osaka, Japan

[21] Appl. No.: 243,044

[22] Filed: Sep. 12, 1988

[30] Foreign Application Priority Data

Sep. 11, 1987 [JP] Japan .................... 62-229412
Sep. 11, 1987 [JP] Japan .................... 62-229413

[51] Int. Cl.$^4$ .................... C08G 59/50; C08G 59/68; C08L 63/10

[52] U.S. Cl. .................... 525/532; 525/423; 525/438

[58] Field of Search .................... 525/532

[56] References Cited

U.S. PATENT DOCUMENTS 4,051,195  9/1977  McWhorter .................... 525/530
4,755,571  7/1988  Irving et al. .................... 525/532
4,766,186  8/1988  Sellstrom et al. .................... 525/532

Primary Examiner—John C. Bleutge
Assistant Examiner—Robert E. L. Sellers, II
Attorney, Agent, or Firm—Wenderoth, Lind Ponack

[57] ABSTRACT

Disclosed is a curable epoxy resin composition having excellent flexibility and toughness, comprising (a) an epoxy resin, (b) a glycol type di(meth)acrylate, (c) a nitrogen containing heterocyclic compound, and (d) a polyamine having at least two amino groups with an active hydrogen. The resin composition is very suitable for a vibration damping laminate.

6 Claims, 3 Drawing Sheets

COMPOSITION CONTAINING EPOXY RESIN, DI(METH)ACRYLATE, N-HETEROCYLIC COMPOUND AND POLYAMINE

FIELD OF THE INVENTION

The present invention relates to a curable epoxy resin composition and a laminate therefrom.

BACKGROUND OF THE INVENTION

Epoxy resin is excellent in mechanical and chemical characteristics and therefore widely employed in various fields. However, since it is hard and brittle, its usage is limited in spite of its excellent properties. It has been desired to develop an epoxy resin having flexibility.

In order to impart flexibility to the epoxy resin, it is proposed than an epoxy resin be modified with a higher fatty acid, a cyclic ester or a difunctional rubber component. These modified epoxy resins, however, are required to be cured with a curing agent of an acid anhydride at a relatively high temperature, since it is difficult to cure such resins at room temperature. If a polyamine or polyamide is employed as a curing agent for the modified epoxy resin, it can be cured at room temperature. The cured resin, however, does not have enough flexibility and is short of toughness. Further, the epoxy resin prior to curing has a high viscosity and therefore is not good in workability.

SUMMARY OF THE INVENTION

The present invention is to provide a curable epoxy resin composition which has excellent flexibility and toughness characteristics. The curable epoxy composition of the present invention comprises (a) an epoxy resin, (b) a glycol type di(meth)acrylate, (c) a nitrogen containing heterocyclic compound and (d) a polyamine having at least two amino groups with an active hydrogen.

The present invention also provides a curable epoxy resin composition which has excellent workability.

Further, the present invention provides a laminate having excellent vibration-damping properties which is obtained from the above mentioned curable resin composition.

BRIEF EXPLANATION OF THE DRAWINGS

FIG. 1 shows one or more glass fiber sheets 2 placed between two carbon fiber sheets 1.

FIG. 2 shows one or more glass fiber sheets 2 and one or more carbon fiber sheets 1 alternatively piled up. Also, FIG. 3 shows one or more carbon fiber sheets 1 placed between two glass fiber sheets 2.

DETAILED DESCRIPTION OF THE INVENTION

Figure 1:
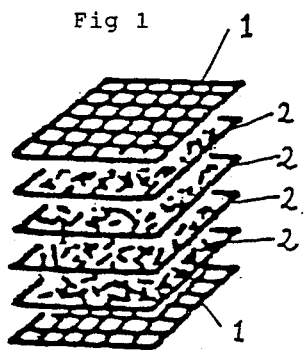
FIGS. 1 to 3 show a laminate construction using both a glass fiber and carbon fiber sheet.

The epoxy resin employed in the present invention is one having at least two epoxy groups in one molecule, for example, a bisphenol A type-, a bisphenol AD type-, a bisphenol F type-, a bisphenol S type-, a hydrogenated bisphenol A type-, a glycol-modified bisphenol type-, a resol type-, a resorcinol type-, a novolac type-epoxy resin, a polyhydric alcohol type-epoxy resin (such as a glycidyl ether of diethylene glycol, propylene glycol, glycerol, neopentyl glycol, trimethylolpropane, di-trimethylolpropane, pentaerythritol or dipentaerythritol), an alicyclic epoxy resin (such as, vinylcyclohexene diepoxy), a urethane modified epoxy resin and a mixture thereof. It is preferred that the epoxy resin has an epoxy equivalent of 85 to 3,000, preferably 100 to 1,000.

The glycol type di(meth)acrylate of the present invention is generally a diester of a dihydric alcohol and (meth)acrylic acid. Examples of the dihydric alcohols are ethylene glycol, diethylene glycol, triethylene glycol, polyethylene glycol, propylene glycol, polypropylene glycol, butylene glycol, hexane glycol, neopentyl glycol and the like. Preferred glycol type di(meth)acrylates are compounds having an average molecular weight of 170 to 3,000 which are shown by the following formula:

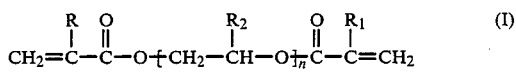

wherein R, $R_1$ and $R_2$ independently represent a hydrogen atom or a methyl group, and n equals 1 to 70, or

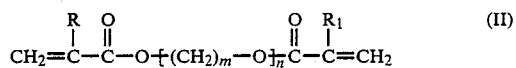

wherein R, $R_1$ and $R_2$ independently represent a hydrogen atom or a methyl group, m equals 3 to 7 and n equals 1 to 70.

In connection with the above the term (meth)acryl or (meth)acrylate means both methacryl and acryl or methacrylate and acrylate respectively. Representative examples of the compounds shown by the formula (I) and (II) are ethyleneglycol di(meth)acrylate, diethyleneglycol di(meth)acrylate, triethyleneglycol di(meth)acrylate, polyethyleneglycol di(meth)acrylate, propyleneglycol di(meth)acrylate, polypropyleneglycol di(meth)acrylate, butyleneglycol di(meth)acrylate, hexaneglycol di(meth)acrylate, and a mixture thereof. The glycol type di(meth)acrylate improves the flexibility and viscosity of the epoxy composition. The amount of the glycol type di(meth)acrylate is preferably 10 to 230 parts by weight, more preferably 15 to 150 parts by weight based on 100 parts by weight of the epoxy resin. Amounts outside of the above range do not provide sufficient flexibility. Preferred glycol type di(meth)acrylates are polyethyleneglycol di(meth)acrylate or polypropylene di(meth)acrylate having an average molecular of 170 to 3,000, preferably 220 to 1,500, which enhances not only the flexibility but also the other properties of the cured composition.

The nitrogen-containing heterocyclic compound of the present invention includes a compound represented by the following formula or a mixture thereof;

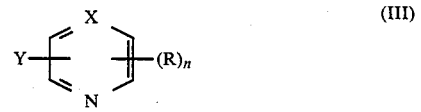

where R independently represents an alkyl group having not more than 9 carbon atoms, a phenyl group, a cyano group, a halogen atom or a carbamoyl group, X represents a carbon atom or a nitrogen atom, Y represents a hydrogen atom, an amino group or an aminomethyl group, n equals 0 to 4; or

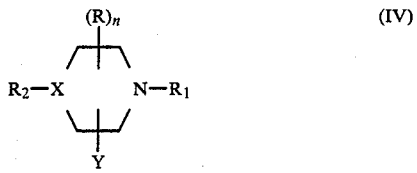

(IV)

wherein X represents a carbon atom or a nitrogen atom, Y represents a hydrogen atom, an amino group or an aminomethyl group, R independently represents an alkyl group having not more than 9 carbon atoms, a phenyl group, a cyano group, a halogen atom or a carbamoyl group, $R_1$ represents a hydrogen atom, an alkyl group having not more than 16 carbon atoms, a phenyl group, an amino group or an aminoalkyl having 1 to 3 carbon atoms, provided that, when Y is an amino group or an aminomethyl group, $R_1$ is not hydrogen, when X is a carbon atom, $R_2$ shows an alkyl group having not more than 9, a phenyl group, a cyano group, a halogen atom or a carbamoyl group, and when X is a nitrogen atom, shows a hydrogen atom, an alkyl group having not more than 9 carbon atoms or a phenyl group, when X is a carbon atom and $R_1$ is an amino group or a $C_1$ to $C_3$ aminoalkyl group, Y is a hydrogen atom, and when X is a nitrogen atom and $R_1$ is an amino group or a $C_1$ to $C_3$ aminoalkyl, Y is a hydrogen atom and $R_2$ is an alkyl group having not more than 9 carbon atoms or a phenyl group, when X is a nitrogen atom, both $R_1$ and $R_2$ are not hydrogen, and n equals 0 to 8.

Examples of the above compounds are pyridine compound, pyrazine compounds, a piperidine compound, a piperazine compounds and the like. Concrete examples of the pyridine compounds are pyridine, alpha-picoline, beta-picoline, gamma-picoline, 2,6-lutidine, 2,4-lutidine, 2,5-lutidine, 3,4-lutidine, 3,5-lutidine, 2-propylpyridine, 4-propylpyridine, 2-ethylpyridine, 3-ethylpyridine, 4-ethylpyridine, 2-methyl-5-ethylpyridine, 2-methyl-4-ethylpyridine, 2-methyl-3-ethylpyridine, 4-methyl-3-ethylpyridine, 4-butylpyridine, 4-isobutylpyridine, 2,4,6-collidine, 2,3,5-collidine, 2,6-dipropylpyridine, 2-phenylpyridine, 4-phenylpyridine, 4-(5-nonly)pyridine, 4-(3-phenylpropyl)pyridine and the like; cyanopyridines, such as 2-cyanopyridine, 3-cyanopyridine, 4-cyanopyridine, 2,6-dicyanopyridine, 2-cyano-4-methylpyridine, 2-cyano-5-methylpyridine, 2-cyano-6-methylpyridine and the like; aminomethylpyridines, such as 2-aminomethylpyridine, 3-aminomethylpyridine, 4-aminomethylpyridine and the like; aminopyridines, such as 2-aminopyridine, 3-aminopyridine, 4-aminopyridine, 2-amino-6-methylpyridine, 2-amino-3-methylpyridine, 2-amino-4-methylpyridine, 2-amino-5-methylpyridine, 2-amino-4-ethylpyridine, 2-amino-5-ethylpyridine, 2-amino-4-propylpyridine, 2-amino-4,6-dimethylpyridine and the like; acid amides, such as picolinamide, isonicotinamide, nicotinamide and the like; chloropyridines, such as 2-chloropyridine, 2,6-dichloropyridine and the like. Examples of the pyrazine compounds are pyrazine; alkylpyrazines, such as 2-methylpyrazine, 2,5-dimethylpyrazine, 2,6-dimethypyrazine, 2,3,5-trimethylpyrazine and the like; cyanopyrazines, such as 2-cyanopyrazine, 2-cyano-5-methylpyrazine and the like; acid amides, such as 2-pyrazinamide, 5-methypyrazinamide and the like; amino(alkyl)pyrazines, such as 2-aminopyrazine, 2-aminomethylpyrazine and the like. Examples of the piperidines are piperidine; pipecolines, such as 2-pipecoline, 3-pipecoline, 4-pipecoline and the like; lupetidines, such as 2,6-lupetidine, 2,4-lupetidine, 3,5-lupetidine, 2,3-lupetidine, 2,5-lupetidine, 3,4-lupetidine and the like; aminomethylpiperidines, such as N-aminopiperidine, N-amino-4-pipecoline, N-aminopropylpiperidine, N-aminopropyl-2-pipecoline, N-aminopropyl-3-pipecoline, N-aminopropyl-4-pipecoline and the like; acid amides, such as pipecolamide, nipecotamide, isonipecotamide and the like; N-alkylpiperidines, such as N-methylpiperidine, N-ethylpiperidine, N-propylpiperidine, N-(2-ethylhexyl)piperidine, N-methyl-2-pipecoline, N-ethyl-2-pipecoline, N-propyl-2-pipecoline, N-(2-ethylhexyl)-2-pipecoline, N-methyl-3-pipecoline, N-ethyl-3-pipecoline, N-propyl-3-pipecoline, N-(2-ethylhexyl)-3-pipecoline, N-methyl-4-pipecoline, N-ethyl-4-pipecoline, N-propyl-4-pipecoline, N-(2-ethylhexyl)-4-pipecoline and the like. The piperidine compounds include N-ethylpiperidine, N-methylpiperidine, N-methyl-2-methylpiperidine, N-methyl-2,5-dimethylpiperidine, N-amino-N'-methylpiperidine, N-aminopropyl-N'-methylpiperidine and the like. Preferred are a pyridine compound or pyrazine compound having a substituent at the 2 and/or 6-position.

The nitrogen containing heterocyclic compound, especially the compounds listed above, is very important for the present invention. When it is combined with the epoxy resin, the glycol type di(meth)acrylate and the polyamine, the purpose of the present invention is effectively accomplished. The compound is present in the curable composition of the present invention in an amount of 5 to 150 parts by weight, preferably 10 to 100 parts by weight based on 100 parts by weight of the polyamine.

The amino group with an active hydrogen includes a primary and a secondary amino group. The polyamine having at least two amino groups with an active hydrogen (hereinafter polyamine) includes an aliphatic polyamine, such as ethylenediamine, tetraethylenediamine, 1,2-diaminopropane, 1,3-diaminopropane, 1,4-diaminobutane, diethylenetriamine, triethylenetetramine, iminobispropylamine, methyliminobispropylamine, 2,2',4-trimethylhexamethylenediamine, hexamethylenediamine, ethyaminoethylamine, methylaminopropylamine, hydroxyethylaminopropylamine, bis(3-aminopropyl)ether, 1,2-bis(3-aminopropoxy)ethane and the like; an alicyclic polyamine, such as isophorondiamine, Epomate (available from Yuka Shell Epoxy Kabushiki Kaisha) and the like; an aromatic polyamine, such as xylylenediamine, phenylenediamine, diaminodiphenylmethane and the like; 1,3-dipiperidylpropane; 1,4-bis(aminopropyl)piperazine; and a mixture thereof.

The curable composition of the present invention can be prepared by mixing the epoxy resin with the glycol type di(meth)acrylate, to which a mixture solution of the nitrogen containing the heterocyclic compound and the polyamine is added. The obtained curable resin composition can be poured into a mold and cured at room temperature or an elevated temperature to obtain a cured article. The amount of the mixture solution containing the heteroxyclic compound and the polyamine is not limited, but preferably is from 60 to 130 equivalent %, more preferably from 70 to 120 equivalent % of the total equivalent of the epoxy equivalent and (meth)acryloyl equivalent. Amounts outside of the above range do not impart suitable flexibility.

The curable resin composition of the present invention can be adjusted in respect to its viscosity at ambient temperature and therefore is very good in workability, such as in casting and impregnating operations. Although the composition is capable of be cured at room temperature to obtain a cured article having enough flexibility, it can also be cured at an elevated temperature to obtain a cured article having suitable physical properties. The temperature to be cured is preferably 50° to 150° C., more preferably 50° to 100° C. and the curing time can be varied with the range of 3 to 24 hours.

The curable composition of the present invention may contain an additive, such as glass fibers, glass powder, silica, silica alumina, alumina fiber, aluminum hydroxide, magnesium hydroxide, calcium carbonate, magnesium carbonate, molybdenum, antimony, carbon fiber, aramide fiber, polyester fibers, nylon fibers, organic microballoons, inorganic microballoons, pulp and the like. Such additives impart excellent properties and therefore the composition is intended to be widely used, for example in automobiles, ships, airplanes, public words, building construction, electric or electronic materials, sports goods and the like. The composition is applicable to artificial marble, laminates, golf heads, tennis rackets and the like.

Figure 2:
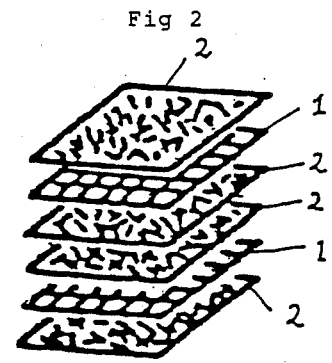
Figure 3:
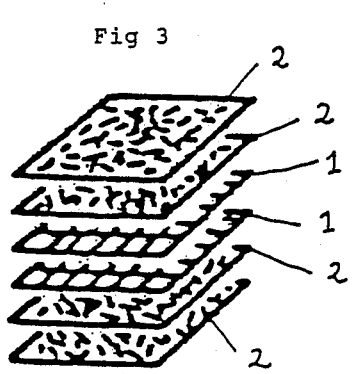

The curable composition of the present invention is very suitable for a laminate. The laminate is generally obtained by piling two or more sheets of glass fiber and/or carbon fiber and the resin composition to be cured. A process of making the laminate is known to the art, for example a hand lay-up process and a compression molding process. FIGS. 1 to 3 show a laminate construction using both a glass fiber and carbon fiber sheet. FIG. 1 shows one or more glass fiber sheets 2 placed between two carbon fiber sheet 1. FIG. 2 shows one or more glass fiber sheets 2 and one or more carbon fiber sheets 1 alternatively piled upon the other. Also, FIG. 3 shows one or more carbon fiber sheets 1 placed between two glass fiber sheets 2. The laminate of the present invention can take any construction mentioned above, but the construction of FIG. 1 is preferable when balancing the hardness and vibration damping properties, as well as the cost. The glass fiber and carbon fiber can be any type. For example, the glass fiber may be pretreated with vinyl silane, epoxy silane, amino silane or an acrylic compound. The carbon fiber can be employed intact or impregnated with an epoxy resin. A temperature for laminating is not limited, but preferably is ambient temperature in view of the hardness and vibration damping properties.

The laminate of the present invention is composed of the glass and/or carbon fiber as a reinforcing material and a resin dispersing between fibers and sheets.

The laminate of the present invention has excellent vibration damping properties and excellent stiffness. For example, in the range of a resonance frequency of 10 Hz to 10,000 Hz, its loss factor is constant and within the range of 0.1 to 0.2, the modulus of elasticity in bending is 2,000 to 2,400 Kgf/mm$^2$ and the modulus of elasticity under tension is 1,400 to 1,700 Kgf/mm$^2$.

The laminate of the present invention has excellent heat distortion temperature properties for example not less than 230° C. and therefore is applicable to an area requiring high heat resistance. The modulus of elasticity in bending, the modulus of elasticity in tension and the loss factor of the laminate can be adjusted by varying the composition and construction of the laminate.

EXAMPLES

The present invention is illustrated by the following examples, which are not to be construed as limiting the present invention to their details.

EXAMPLES 1 TO 22 AND COMPARATIVE EXAMPLES 1 AND 2

The epoxy resin and the glycol type di(meth)acrylate which are shown in Tables 1 to 3 were mixed to obtain a solution to which a mixture solution of the nitrogen containing heterocyclic compound and the polyamine which are also shown in Tables 1 to 3 was added and mixed at room temperature to cast into a mold.

Curing was conducted under the conditions shown in Tables 1 to 3 and the physical properties of the obtained article were evaluated. The result is shown in Tables 4 and 5. For a comparison, a resin composition not containing the glycol type di(meth)acrylate and the nitrogen containing heterocyclic compound was prepared as Comparative Example 1 and another resin composition not containing the nitrogen containing heterocyclic compound was prepared as Comparative Example 2 to evaluate their physical properties (see Tables 4 and 5). The viscosity of the resin compositions are also shown in Tables 4 and 5.

The evaluations were conducted as follow:

(1) Compressive strength and tension strength are determined by using a 2t Autography according to JIS K6911.

(2) Impact strength is determined by using a Sharpy impact strength determining apparatus according to JIS K6911.

(3) Elongation is determined by using a 2t Autography according to JIS K7113.

TABLE 1

| Examples | a Epoxy resin | b Glycol type di(meth)-acrylate | c Nitrogen-containing heterocyclic compound | d Polyamine compound | Formulation Parts by wt | | | | Curing conditions |
|---|---|---|---|---|---|---|---|---|---|
| | | | | | a | b | c | d | |
| 1 | EP-828 | Polyethylene glycol diacrylate (Mw = 310) | 2-Amino-6-methyl-pyridine | 1,2-Diaminopropane | 55 | 45 | 4 | 9 | 25° C. 7 days |
| 2 | EP-828 | Polyethylene glycol diacrylate (Mw = 310) | 2-Amino-6-methyl-pyridine | Iminobispropyl-amine | 70 | 30 | 5 | 10 | 25° C. 7 days |
| 3 | EP-828 | Polyethylene glycol diacrylate (Mw = 310) | 2-Amino-6-methyl-pyridine | 1,4-Bisamino-propylpiperazine | 60 | 40 | 15 | 15 | 25° C. 7 days |
| 4 | EP-828 | Polyethylene glycol diacrylate (Mw = 310) | 2-Amino-6-methyl-pyridine | 1,2-Diaminopropane | 55 | 45 | 4 | 9 | 25° C.; 14 hr 70° C.; 8 hr |
| 5 | EP-828 | Polyethylene glycol diacrylate (Mw = 310) | 2-Cyanopyrazine | 1,2-Diaminopropane | 50 | 50 | 6 | 11 | 55° C.; 24 hr 50° C.; 12 hr |

TABLE 1-continued

| Examples | a<br>Epoxy resin | b<br>Glycol type di(meth)-acrylate | c<br>Nitrogen-containing heterocyclic compound | d<br>Polyamine compound | Formulation Parts by wt a | b | c | d | Curing conditions |
|---|---|---|---|---|---|---|---|---|---|
| 6 | EP-828 | Polyethylene glycol diacrylate (Mw = 310) | 4-Cyanopyridine | 1,2-Diaminopropane | 65 | 35 | 3 | 10 | 55° C.; 24 hr<br>50° C.; 12 hr |
| 7 | EP-828 | Polyethylene glycol diacrylate (Mw = 310) | 2-Chloropyridine | 1,2-Diaminopropane | 65 | 35 | 3 | 11 | 55° C.; 24 hr<br>50° C.; 12 hr |
| 8 | EP-828 | Polyehtylene glycol diacrylate (Mw = 310) | 2,6-Lutidine | 1,2-Diaminopropane | 80 | 20 | 4 | 9 | 55° C.; 24 hr<br>50° C.; 12 hr |
| 9 | EP-828 | Polyethylene glycol diacrylate (Mw = 310) | 2,6-Dimethyl-piperidine | 1,2-Diaminopropane | 50 | 50 | 4 | 11 | 50° C.; 12 hr |
| 10 | EP-828 | Polyethylene glycol diacrylate (Mw = 310) | N—2-Ethylhexyl-piperidine | 1,2-Diaminopropane | 60 | 40 | 3 | 10 | 50° C.; 12 hr |
| 11 | EP-828 | Polyethylene glycol diacrylate (Mw = 310) | N—Methylpiperazine | 1,2-Diaminopropane | 60 | 40 | 3 | 10 | 50° C.; 12 hr |
| 12 | EP-828 | Polyethylene glycol diacrylate (Mw = 500) | 2-Amino-6-methyl-pyridine | 1,2-Diaminopropane | 70 | 30 | 5 | 10 | 25° C.; 24 hr<br>100° C.; 8 hr |
| 13 | EP-828 | Polyethylene glycol diacrylate (Mw = 500) | 2-Aminopyridine | 1,2-Diaminopropane | 70 | 30 | 5 | 10 | 25° C.; 24 hr<br>100° C.; 8 hr |
| 14 | EP-828 | Polyethylene glycol diacrylate (Mw = 720) | 2-Amino-6-methyl-pyridine | 1,2-Diaminopropane | 80 | 20 | 3 | 10 | 25° C.; 24 hr<br>100° C.; 8 hr |
| 15 | EP-828 | Polyethylene glycol diacrylate (Mw = 1100) | 2-Amino-6-methyl-pyridine | 1,2-Diaminopropane | 80 | 20 | 3 | 9 | 25° C.; 24 hr<br>100° C.; 8 hr |
| 16 | EP-828 | Polyethylene glycol diacrylate (Mw = 340) | 2-Amino-6-methyl-pyridine | 1,2-Diaminopropane | 60 | 40 | 10 | 10 | 50° C.; 12 hr<br>100° C.; 8 hr |
| 17 | EP-828 | Polyethylene glycol diacrylate (Mw = 340) | 2-Methyl-5-ethyl-pyridine | 1,2-Diaminopropane | 60 | 40 | 3 | 10 | 50° C.; 12 hr<br>100° C.; 8 hr |
| 18 | EP-828 | Polypropylene glycol diacrylate (Mw = 500) | 2-Amino-6-methyl-pyridine | 1,2-Diaminopropane | 70 | 30 | 8 | 8 | 50° C.; 12 hr<br>100° C.; 8 hr |
| 19 | EP-828 | Triethylene glycol diacrylate (Mw = 258) | 2-Amino-6-methyl-pyridine | Triethylenetetramine | 50 | 50 | 10 | 10 | 25° C.; 12 hr<br>100° C.; 8 hr |
| 20 | EP-828 | 1,6-Hexane glycol diacrylate (Mw = 226) | 2-Amino-6-methyl-pyridine | 1,2-Diaminopropane | 80 | 20 | 9 | 9 | 25° C.; 12 hr<br>100° C.; 8 hr |
| 21 | EP-828 | 1,6-Hexane glycol diacrylate (Mw = 226) | Alpha-picoline | 1,2-Diaminopropane | 80 | 20 | 3 | 12 | 25° C.; 12 hr<br>100° C.; 8 hr |
| 22 | EP-828 | Polyethylene glycol diacrylate (Mw = 310) | 2-Aminopyrazine | 1,2-Diaminopropane | 60 | 40 | 4 | 9 | 25° C.; 12 hr<br>100° C.; 8 hr |
| Comparative Example 1 | EP-828 | — | — | Triethylenetetramine | 100 | — | — | 9 | 20° C.<br>7 days |
| 2 | EP-828 | Polyethylene glycol diacrylate (Mw = 310) | — | 1,2-Diaminopropane | 60 | 40 | — | 10 | 25° C.; 24 hr<br>100° C.; 8 hr |

Note: EP-828 is short for Epicote 828 which is a bisphenol type epoxy resin available from Yuka Shell Epoxy Kabushiki Kaisha.

TABLE 2

| Examples | Compresion strength Kgf/cm$^2$ | Impact strength (Sharpy) Kgf/cm$^2$ | Tension strength Kgf/cm$^2$ | Elongation % | Viscosity cps 20° C. |
|---|---|---|---|---|---|
| 1 | No fracture | No fracture | 196 | 10 | 250 |
| 2 | No fracture | No fracture | 40 | 25 | 800 |
| 3 | No fracture | No fracture | 70 | 25 | 340 |
| 4 | 102 | No fracture | 120 | 20 | 250 |
| 5 | 218 | No fracture | 250 | 10 | 200 |
| 6 | 172 | No fracture | 190 | 10 | 300 |
| 7 | 218 | No fracture | 230 | 10 | 300 |
| 8 | 372 | 19 | 320 | 8 | 2000 |
| 9 | 148 | 18 | 150 | 20 | 200 |
| 10 | 176 | 22 | 190 | 10 | 340 |
| 11 | 200 | No fracture | 220 | 10 | 340 |
| 12 | No fracture | No fracture | 40 | 25 | 2000 |
| 13 | 150 | No fracture | 170 | 15 | 2000 |
| 14 | No fracture | No fracture | 90 | 20 | 4500 |
| 15 | No fracture | No fracture | 80 | 20 | 6000 |
| 16 | No fracture | No fracture | 20 | 30 | 400 |
| 17 | No fracture | No fracture | 46 | 35 | 400 |
| 18 | No fracture | No fracture | 100 | 20 | 1500 |
| 19 | No fracture | No fracture | 120 | 20 | 150 |
| 20 | No fracture | No fracture | 250 | 10 | 550 |
| 21 | No fracture | No fracture | 300 | 10 | 550 |
| 22 | No fracture | No fracture | 150 | 20 | 340 |
| Comparative Example 1 | 1000 | 6.0 | 470 | 2 | 18000 |
| 2 | 567 | 10.5 | 510 | 2 | 340 |

EXAMPLE 23

Figure 4:
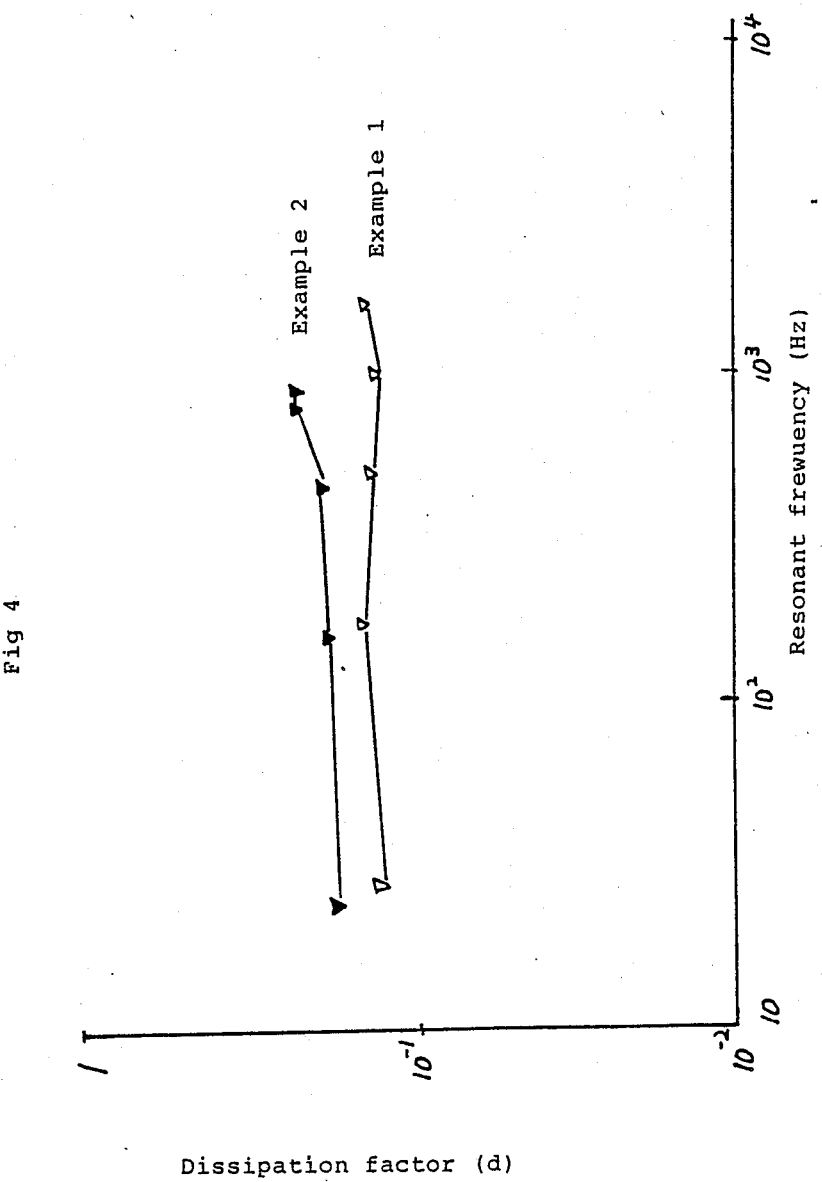
FIG. 4 shows the relation of loss factor and resonance frequency of the laminate in Examples 23 and 24.

A curable resin composition was prepared by mixing 186 g of Epicote 828, 200 g of polyethylene glycol dimethacrylate, 42 g of methylpiperazine and 33 g of 1,2-diaminopropane. The resin composition had a viscosity of 300 cps at 20° C. The resin composition and four sheets of glass fiber (REW-450-G5 which is available from Nippon Sheet Glass Co. Ltd.) were piled up at ambient temperature by a hand lay-up method to form a thick sheet having 400 mm×250 mm×3 mm and it was allowed to stand for 12 hours, followed by after-curing 100° C. for three hours. The obtained laminate was cut in width 10 mm to form a sample to which a vibration and tension test were conducted. A heat distortion temperature was also measured. The relationship of the loss factor and resonance frequency of the laminate is shown in FIG. 4. It had a modulus of elasticity in tension of 500 Kgf/mm$^2$, a modulus of elasticity in bending of 750 Kgf/mm$^2$. Its heat distortion temperature was not less than 220° C.

The above test was conducted as follows:

(a) The vibration test was conducted by using a Bruel and Kjaer type complex modulus of elasticity determining apparatus. A resonance curve was determined and a dynamic modulus of elasticity in bending was calculated from the resonance frequency and the loss factor (d) was obtained from a half value of the resonance peak.

(b) The tension test was conducted by using an Instron type universal tester (4206 type) at a gauge length of 70 mm and a crosshead speed of 1 mm/min.

(c) The heat distortion temperature was determined according to JIS K-6911 5.34.

EXAMPLE 24

A curable resin composition was prepared by mixing 250 g of Epicote 828, 250 g of polyethylene glycol diacrylate, 51 g of 2-amino-6-methylpyridine and 36 g of 1,3-diaminopropane. The resin composition had a viscosity of 280 cps at 20° C. The resin composition and four sheets of glass fiber (REW-450-G5) were piled up at ambient temperature by a hand lay-up method to form a thick sheet having 400 mm×250 mm×3 mm and it was allowed to stand for 7 days. The obtained laminate was cut in width 10 mm to form a sample to which a vibration and tension test were conducted as described in Example 23. A heat distortion temperature was also measured. A relation of loss factor and resonance frequency of the laminate is shown in FIG. 4. It had a modulus of elasticity in tension of 1,000 Kgf/mm$^2$, a modulus of elasticity in bending of 550 Kgf/mm$^2$. Its heat distortion temperature was not less than 220° C.

EXAMPLE 25

Figure 5:
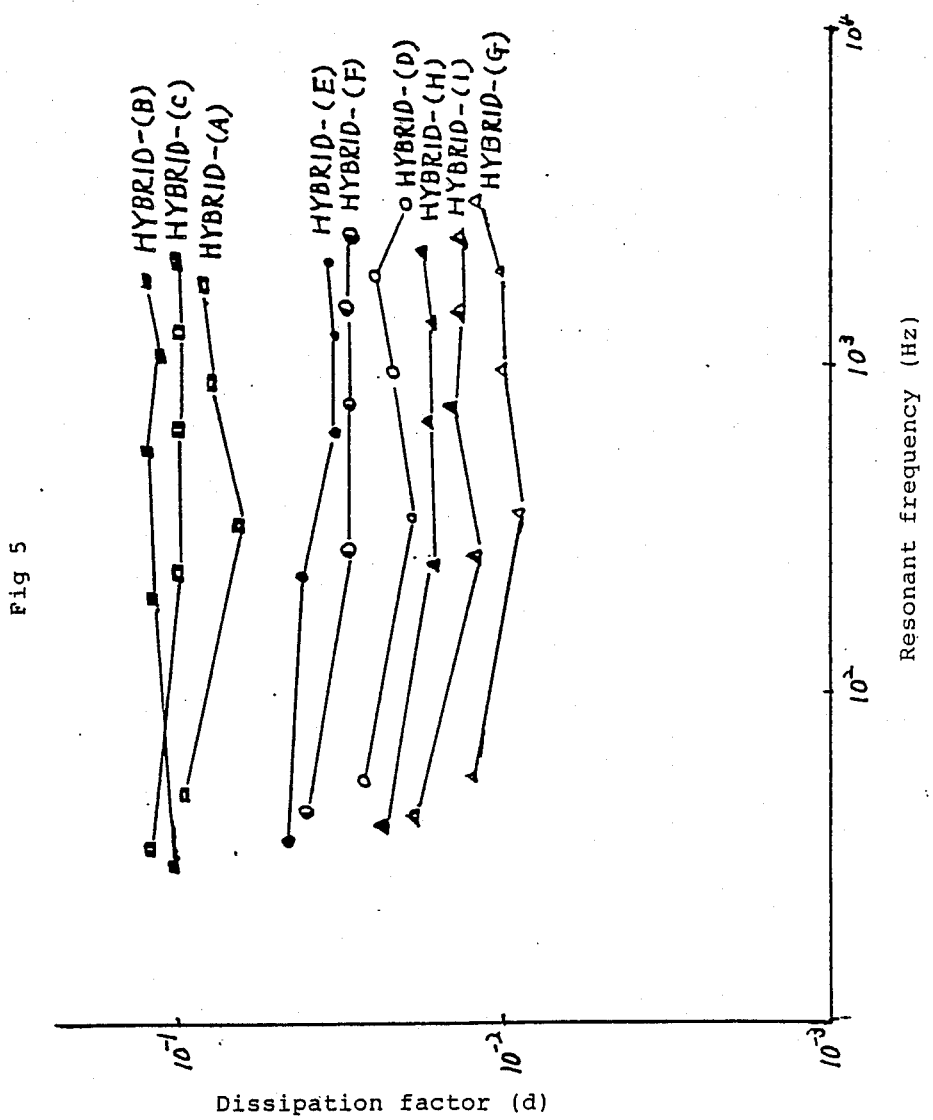
FIG. 5 shows the relation of loss factor and resonance frequency of each laminate in Examples 25, 26 and 27.

A curable resin composition was prepared by mixing 250 g of Epicote 828, 250 g of polyethylene glycol diacrylate, 26 g of 2,6-dimethylpyridine and 50 g of 1,2-diaminopropane. The resin composition had a viscosity of 280 cps at 20° C. The resin composition, four sheets of glass fiber (REW-450-G5) and two sheets of carbon fiber (Toreka C 06343 available from Toray Industries, Inc.) were piled up at ambient temperature by a hand lay-up method to form a thick sheet having 400 mm×250 mm×3 mm and it was allowed to stand for 10 hours, followed by after-curing at 100° C. for three hours to obtain three type laminates shown in FIGS. 1 to 3. The obtained laminates were cut in width 10 mm to form a sample to which a vibration and tension test were conducted, respectively. A heat distortion temperature was also measured. A relation of loss factor and resonance frequency of the each laminate is shown in FIG. 5. A modulus of elasticity in tension, a modulus of elasticity in bending and a heat distortion temperature was shown in Table 3. In the Table and Figure, the laminate having the construction of FIG. 1 is indicated by HYBRID-A, FIG. 2 is indicated by HYBRID-B and FIG. 3 is indicated by HYBRID-C.

EXAMPLE 26

A curable resin composition was prepared by mixing 300 g of Epicote 828, 200 g of polyethylene glycol diacrylate, 25 g of 2,6-dimethylpyridine and 51 g of 1,2-diaminopropane. The resin composition, four sheets of glass fiber (REW-450-G5) and two sheets of carbon fiber (Toreka C 06343 available from Toray Company) were piled up at ambient temperature by a hand lay-up method to form a thick sheet having 400 mm×250 mm×3 mm and it was allowed to stand for 10 hours, followed by after-curing at 100° C. for three hours to obtain three type laminates shown in FIGS. 1 to 3. The obtained laminates were cut in width 10 mm to form a sample to which a vibration and tension test were conducted, respectively. A heat distortion temperature was also measured. A relation of loss factor and resonance frequency of the each laminate is shown in FIG. 5. A modulus of elasticity in tension, a modulus of elasticity in bending and a heat distortion temperature are shown in Table 3. In the Table and Figure, the laminate having the construction of FIG. 1 is indicated by HYBRID-D, FIG. 2 is indicated by HYBRID-E and FIG. 3 is indicated by HYBRID-F.

EXAMPLE 27

A curable resin composition was prepared by mixing 350 g of Epicote 828, 150 g of polyethylene glycol diacrylate, 24 g of 2,6-dimethylpyridine and 50 g of 1,2-diaminopropane. The resin composition, four sheets of glass fiber (REW-450-G5) and two sheets of carbon fiber (Toreka C 06343) were piled up at ambient temperature by a hand lay-up method to form a thick sheet having 400 mm×250 mm×3 mm and it was allowed to stand for 10 hours, followed by after-curing at 100° C. for three hours to obtain three type laminates shown in FIGS. 1 to 3. The obtained laminates were cut in width 10 mm to form a sample to which a vibration and tension test were conducted, respectively. A heat distortion temperature was also measured. A relation of loss factor and resonance frequency of the laminate is shown in FIG. 5. A modulus of elasticity in tension, a modulus of elasticity in bending and a heat distortion temperature are shown in Table 3. In the Table and Figure, the laminate having the construction of FIG. 1 is indicated by HYBRID-G, FIG. 2 is indicated by HYBRID-H and FIG. 3 is indicated by HYBRID-I.

TABLE 3

| Laminate name | Modulus of elasticity in tension Kgf/mm$^2$ | Modulus of elasticity in bending Kgf/mm$^2$ | Heat distortion temperature °C. |
|---|---|---|---|
| HYBRID-A | 800 | 1,900 | 189 |
| HYBRID-B | 900 | 1,050 | 197 |
| HYBRID-C | 1,000 | 700 | 192 |
| HYBRID-D | 950 | 2,200 | At least 230 |
| HYBRID-E | 1,300 | 1,400 | At least 230 |

TABLE 3-continued

| Laminate name | Modulus of elasticity in tension Kgf/mm² | Modulus of elasticity in bending Kgf/mm² | Heat distortion temperature °C. |
|---|---|---|---|
| HYBRID-F | 1,500 | 1,000 | At least 230 |
| HYBRID-G | 1,500 | 2,300 | At least 230 |
| HYBRID-H | 1,600 | 1,400 | At least 230 |
| HYBRID-I | 1,700 | 1,100 | At least 230 |

What is claimed is:

1. A curable resin composition comprising;
(a) an epoxy resin having at least two epoxy groups in each molecule,
(b) an diester of a dihydric alcohol and (meth)acrylic acid,
(c) a nitrogen containing heterocyclic compound represented by the following formula or a mixture thereof

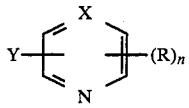 (III)

wherein R independently represents an alkyl group having not more than 9 carbon atoms, a phenyl group, a cyano group, a halogen atom or a carbamoyl group, X represents a carbon atom or a nitrogen atom, Y represents a hydrogen atom, an amino group or an aminomethyl group, n equals 0 to 4, or

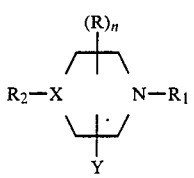 (IV)

wherein X represents a carbon atom or a nitrogen atom, Y represents a hydrogen atom, an amino group or an aminomethyl group, R independently represents an alkyl group having not more than 9 carbon atoms, a phenyl group, a cyano group, a halogen atom or a carbamoyl group, $R_1$ represents a hydrogen atom, an alkyl group having not more than 16 carbon atoms, a phenyl group, an amino group or an aminoalkyl having 1 to 3 carbon atoms, provided that when Y is an amino group or an aminomethyl group $R_1$ is an alkyl group having not more than 16 carbon atoms or a phenyl group, when X is a carbon atom, $R_2$ is an alkyl group having not more than 9 carbons, a phenyl group, a cyano group, a halogen atom or a carbamoyl group; when X is a nitrogen atom, $R_2$ is an alkyl group having not more than 9 carbon atoms or a phenyl group; when X is a carbon atom and $R_1$ is an amino group or a $C_1$ to $C_3$ aminoalkyl group, X is a hydrogen atom; when X is a nitrogen atom and $R_1$ is an amino group or a $C_1$ to $C_3$ aminoalkyl, Y is a hydrogen atom and $R_2$ is an alkyl group having not more than 9 carbon atoms or a phenyl group; and when X is a nitrogen atom, both $R_1$ and $R_2$ are not hydrogen; n equals 0 to 8, and
(d) a polyamine having at least two amino groups with an active hydrogen.

2. The curable resin composition according to claim 1 wherein the diester of a dihydric alcohol and (meth)acrylic acid is a compound having an average molecular weight of 170 to 3,000 which is shown by the following formula:

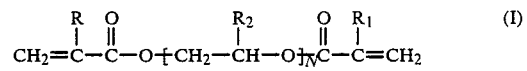 (I)

wherein R, $R_1$ and $R_2$ independently represent a hydrogen atom or a methyl group, and n equals 1 to 70, or

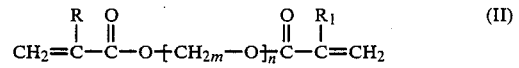 (II)

wherein R, $R_1$ and $R_2$ independently represent a hydrogen atom or a methyl group, and m equals 3 to 7 and n equals 1 to 70.

3. The curable resin composition according to claim 1 wherein the diester of a dihydric alcohol and (meth)acrylic acid is present in the composition in an amount of 15 to 150 parts by weidht based on 100 parts by weight of the epoxy resin.

4. The curable resin composition according to claim 1 wherein the nitrogen containing heterocyclic compound is present in the composition in an amount of 10 to 100 parts by weight based on 100 parts by weight of the polyamine.

5. The curable composition according to claim 1 wherein the total amount of the polyamine and the nitrogen containing heterocyclic compound is from 60 to 130 equivalent % of the total amount of the epoxy equivalent and the (meth)acryloyl equivalent.

6. The curable resin composition according to claim 1 wherein the diester of a dihydric alcohol and (meth)acrylic acid is present in the composition in an amount of 15 to 150 parts by weight based on 100 parts by weight of the epoxy resin, the nitrogen containing heterocyclic compound is present in the composition in an amount of 10 to 100 parts by weight based on 100 parts by weight of the polyamine and the total amount of the polyamine and the nitrogen containing heterocyclic compound is from 60 to 130 equivalent % of the total amount of the epoxy equivalent and the (meth)acryloyl equivalent.

* * * * *